United States Patent [19]
Reynolds

[11] 3,872,450
[45] Mar. 18, 1975

[54] FUSIBLE LINK MEMORY CELL FOR A PROGRAMMABLE READ ONLY MEMORY

[75] Inventor: Thomas Linn Reynolds, Phoenix, Ariz.

[73] Assignee: Motorola, Inc., Chicago, Ill.

[22] Filed: June 21, 1973

[21] Appl. No.: 372,454

[52] U.S. Cl. ............... 340/173 SP, 357/45, 357/48, 357/51

[51] Int. Cl. ............................................ G11c 17/00

[58] Field of Search ........... 340/173 SP; 357/45, 48, 357/51

[56] References Cited

UNITED STATES PATENTS

| | | | |
|---|---|---|---|
| 3,529,299 | 9/1970 | Chung et al. | 340/173 SP |
| 3,582,908 | 6/1971 | Koo | 340/173 SP |
| 3,721,964 | 3/1973 | Barrett et al. | 340/173 SP |

OTHER PUBLICATIONS

Tang, Read-Only Store Design, IBM Technical Disclosure Bulletin, Vol. 13, No. 12, 5/71, pp. 3,840–3,841.

DeWitt et al., Memory Array, IBM Technical Disclosure Bulletin, Vol. 10, No. 1, 6/67, p. 95.

*Primary Examiner*—Stuart N. Hecker
*Attorney, Agent, or Firm*—Vincent J. Rauner; Kenneth R. Stevens

[57] ABSTRACT

A programmable read only memory (PROM) arranged in matrices, each matrix having a plurality of memory cells arranged in rows and columns is disclosed. A particular cell in a matrix may be addressed by selecting the appropriate row and column. Each cell is comprised of a cell transistor with a fusible link in the collector circuit of the cell transistor. If the fusible link is conductive, the cell transistor conducts all of the current supplied by a current source and a binary "0" is indicated as being stored. If the fusible link is open, the major portion of the supplied current flows through a sense transistor associated with the selected cell and a binary "1" is indicated as being stored. The link is opened by selecting a cell, elevating the voltage across the link, and by causing a heavy current to flow through the link, thereby causing it to open.

6 Claims, 5 Drawing Figures

FUSIBLE LINK MEMORY CELL FOR A PROGRAMMABLE READ ONLY MEMORY

BACKGROUND OF THE INVENTION

1. Field of the Invention

This invention relates generally to digital computers, store and forward systems, data handling systems and the like. More specifically, it relates to a programmable read only memory (PROM) which is particularly useful in conjunction with emitter coupled logic circuitry (ECL), but not limited to such use.

A PROM is defined as a memory which is permanently programmed during construction with a desired pattern of binary "1"s and "0"s. Once having been permanently programmed, the PROM can only be interrogated as to its content. The contents are not capable of being altered. In a digital computer, such a memory often is used as a substitute for complex circuitry required for the execution of instruction steps.

DESCRIPTION OF THE PRIOR ART

Prior art PROMs have been made up of magnetic cores and also of capacitors. These systems have suffered from being relatively expensive, but more importantly, not fast enough to serve the required purpose.

Solid state PROMs having cells comprised of bipolar transistors have been tried. They have utilized fusible links in the emitter circuit and others have utilized fusible links in the base circuit. Neither of the circuits have been particularly successful because of the sporadic and unreliable systems for opening the fusible links as desired. With the fusible link in the emitter circuit, cell selection circuitry must be provided that has voltage level separation equal to the maximum voltage necessary to open a fusible link. This necessitates a relatively small voltage and it has been found that designing a fusible link which will open at a small voltage is difficult — at least a 3 volt separation must be provided.

The instant invention overcomes these difficulties by utilizing a sense transistor and by placing a fusible link in the collector circuit of the cell transistor. The voltage levels required for selection and for opening the fusible link are all within normal ECL logic levels. Higher speed and much higher reliability on opening the fusible links is the result of this invention.

BRIEF SUMMARY OF THE INVENTION

In the preferred embodiment, a PROM is provided using ECL addressing, sensing and fusing circuitry. Each cell is comprised of a cell transistor and a fusible link, the cell transistor having its collector connected to ground potential through the fusible link for the Read Only operation, but having had its collector connected to a +5 volts potential initially, for the fusing operation. The collector of an associated sense transistor is connected to a load, which in the preferred embodiment is an ECL output buffer circuit, presenting a voltage representative of a binary "0" when the fusible link is conductive and presenting a voltage representative of a binary "1" when the fusible link is open.

Starting with a matrix of memory cells having conductive fusible links representing all "0"s, a cell which is to contain a "1" is selected using the available selection circuitry. The collectors of all of the cell transistors in the matrix are connected to +5 volts, a 30 milliampere current source is connected to the fusing circuitry, and the fusing circuitry is activated to permit the 30 milliamperes of fusing current to flow through the fusible link and collector of the selected cell transistor. The +5 volts and 30 milliampere current combination are sufficient to cause the fusible link to open, thereby permanently storing a binary "1" in the selected cell.

In the preferred embodiment, both the cell transistor and the sense transistor are of the NPN type. With a voltage applied to the base of the sense transistor in the order of 200 mv to 400 mv, negative with respect to that applied to the base of the cell transistor, all of 1 milliampere of current supplied by the current source passes through the cell transistor when the fusible link is conductive. However, when the fusible link is open, indicating a "1", approximately 85 percent of the current flows through the sense transistor. This result occurs because of a parasitic substrate transistor which becomes effective due to the open collector of the cell transistor. The base and collector of the cell transistor serve as the emitter and base, respectively, of the substrate transistor. The substrate on which the cell transistor is formed serves as the collector of the substrate transistor. This substrate transistor debiases the forward base to emitter bias of the cell transistor permitting only 15 percent of the milliampere of current supplied by the current source to flow through that junction.

A primary object of this invention is to provide a Read Only memory having a very high acess time.

Another important object of this invention is to provide a method of reliably opening fusible links at desired addresses.

Still another object is to provide a Read Only memory that is capable of being read with a high degree of accuracy.

Still another object is to provide a PROM wherein the voltages necessary for the opening of the flusible links are compatible with the circuitry used for the Read Only operation.

These and other objects are evident in the detailed description that follows.

DETAILED DESCRIPTION OF THE INVENTION

Figure 1:
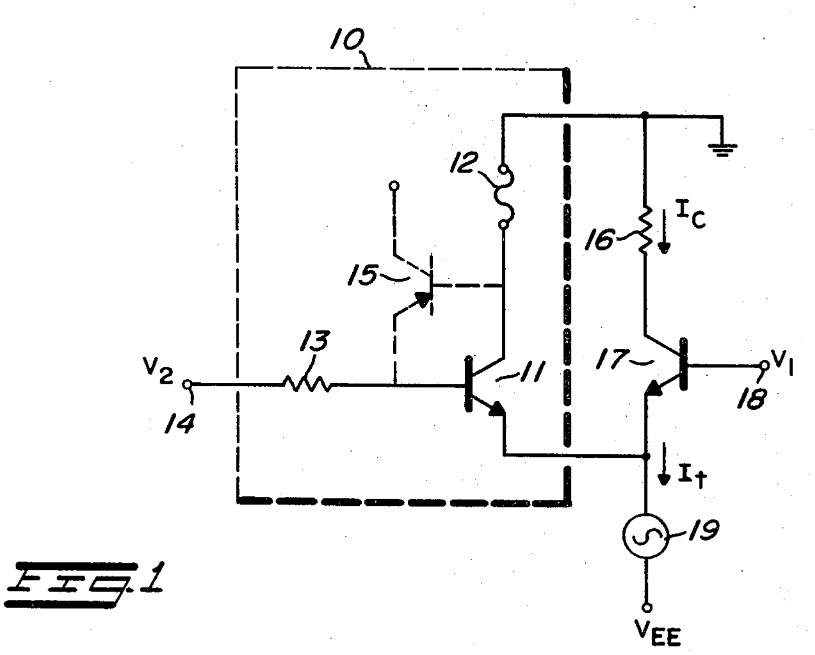
FIG. 1 is a schematic diagram of a PROM memory cell together with an associated current source and sense transistor.

FIG. 1 illustrates a memory cell 10 which includes NPN transistor 11 having a base resistor 13 and an input terminal 14. Fusible link 12 is in the collector circuit and is connected to ground. In the preferred embodiment, the fusible link is made of nichrome. Also, all of the transistors, with the exception of a parasitic substrate PNP transistor associated with each memory cell, are of the NPN type and therefore no more reference will be made as to the type.

Associated with the memory cell is current source 19 which provides current $I_t$ which is equal to 1 milliampere. Also associated with the cell is sense transistor 17 with load resistor 16 in its collector circuit. The voltage V1 supplied at terminal 18 is in the order of 200 to 400 mv more negative than voltage V2 applied to terminal 14. When fusible link 12 is conductive, sense transistor 17 is biased off and essentially all of $I_t$ flows through cell transistor 11. When the fusible link 12 is open, sense transistor 17 conducts approximately 85 percent of $I_t$. By definition, when fusible link 12 is open, the cell contains a binary "1" and when it is conductive, the cell contains a binary "0".

Figure 3:
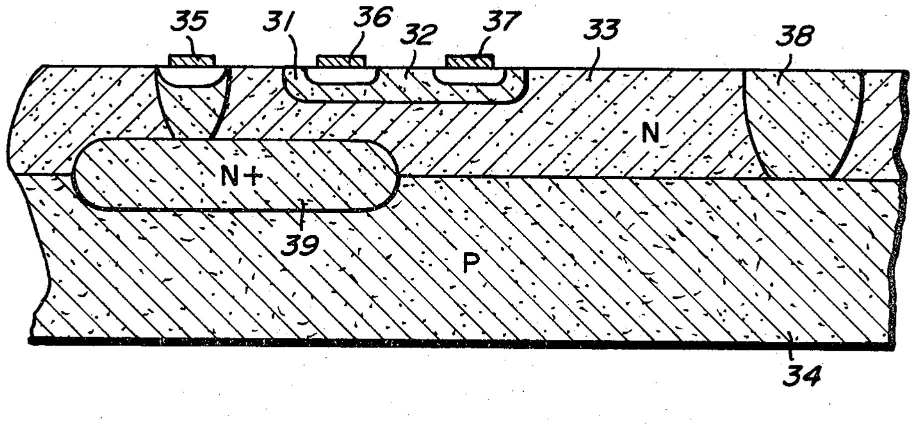
FIG. 3 is a cross-section of a silicon substrate having an epitaxial layer grown thereon, embodying the sense transistor.
Figure 4:
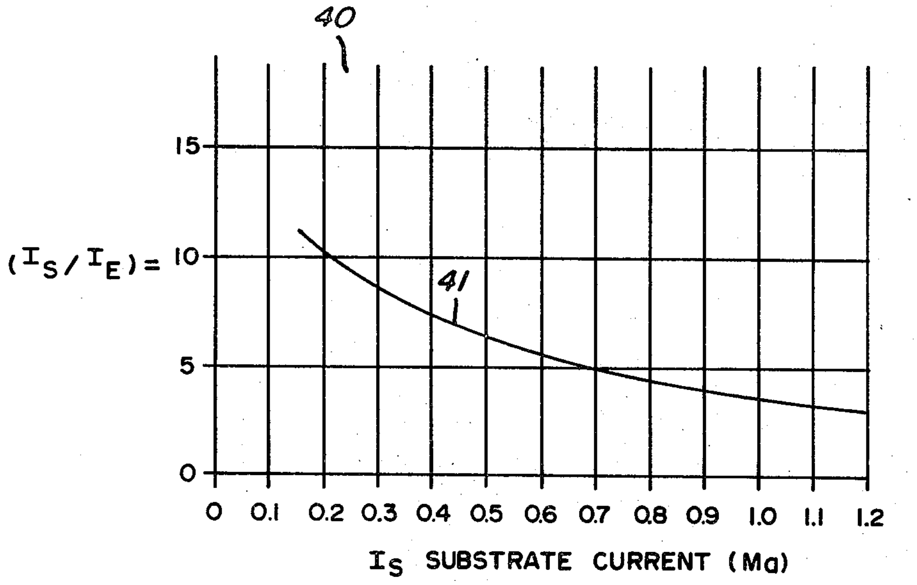
FIG. 4 is a graph illustrating the beta of a parasitic substrate versus the substrate current.

The read out of this cell utilizes the substrate PNP action of an open collector device. With fusible link 12 open, the collector of cell transistor 11 is open and the base to emitter junction is forward biased. A large portion of the minority carriers injected into the base region from the emitter cross the narrow base region and are swept into the collector depletion layer. Because the net collector current is 0, an equilibrium condition is established resulting in a forward bias potential on the collector to base junction. Reference should be made to FIG. 3 to fully understand this action. The buried layer 39 is shown extending partially beneath base 32 of transistor 11 in which emitter 31 has been diffused. Collector 33 is typically an epitaxial layer having a contact 35. Base 32 acts as the emitter of parasitic substrate transistor 15 shown in dashed lines in FIG. 1. The collector 33 is the base of parasitic transistor 15 while substrate 34 is the collector. Transistor 15 exists primarily in the area away from the buried layer 39.

Figure 2:
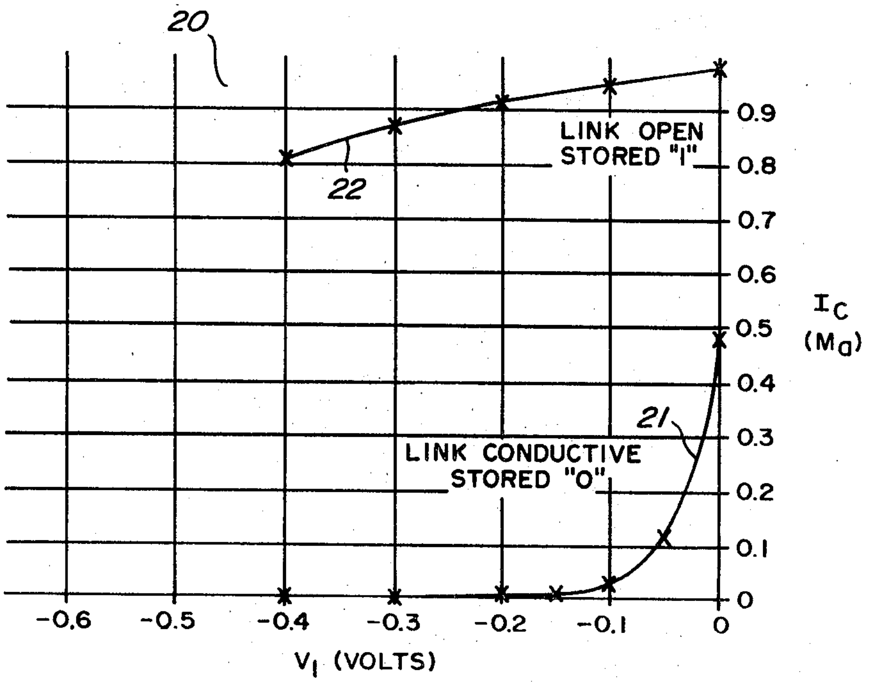
FIG. 2 is a graph showing the current flow through the sense transistor when the fusible link is open and when it is conductive.

A typical beta for such a parasitic transistor is 10 to 15 at substrate currents of 0.1 milliamperes. Graph 40 illustrates the ratio of the substrate current to the emitter current of transistor 11 plotted against the substrate current, resulting in curve 41. Since the emitter current of transistor 11 is equivalent to the current drive to the base of parasitic transistor 15, the ratio of the substrate current to the emitter current is essentially the beta of parasitic transistor 15. A de-biasing effect results between the base and emitter of transistor 11 due to the flow of the substrate current and the emitter current through the bulk base resistance of transistor 11. this de-biasing effect results in a base to emitter current through transistor 11 of a value that is 10 to 15 percent of the current through the sense transistor 17, dependent, of course, on the value of base resistance 13 which, in the preferred embodiment, is approximately 350 ohms. The graph 20 of FIG. 2 illustrates the current $I_c$ through load resistor 16 and sense transistor 17 with the fusible link open as shown in curve 22 and with the fusible link conductive as shown in curve 21.

Figure 5:
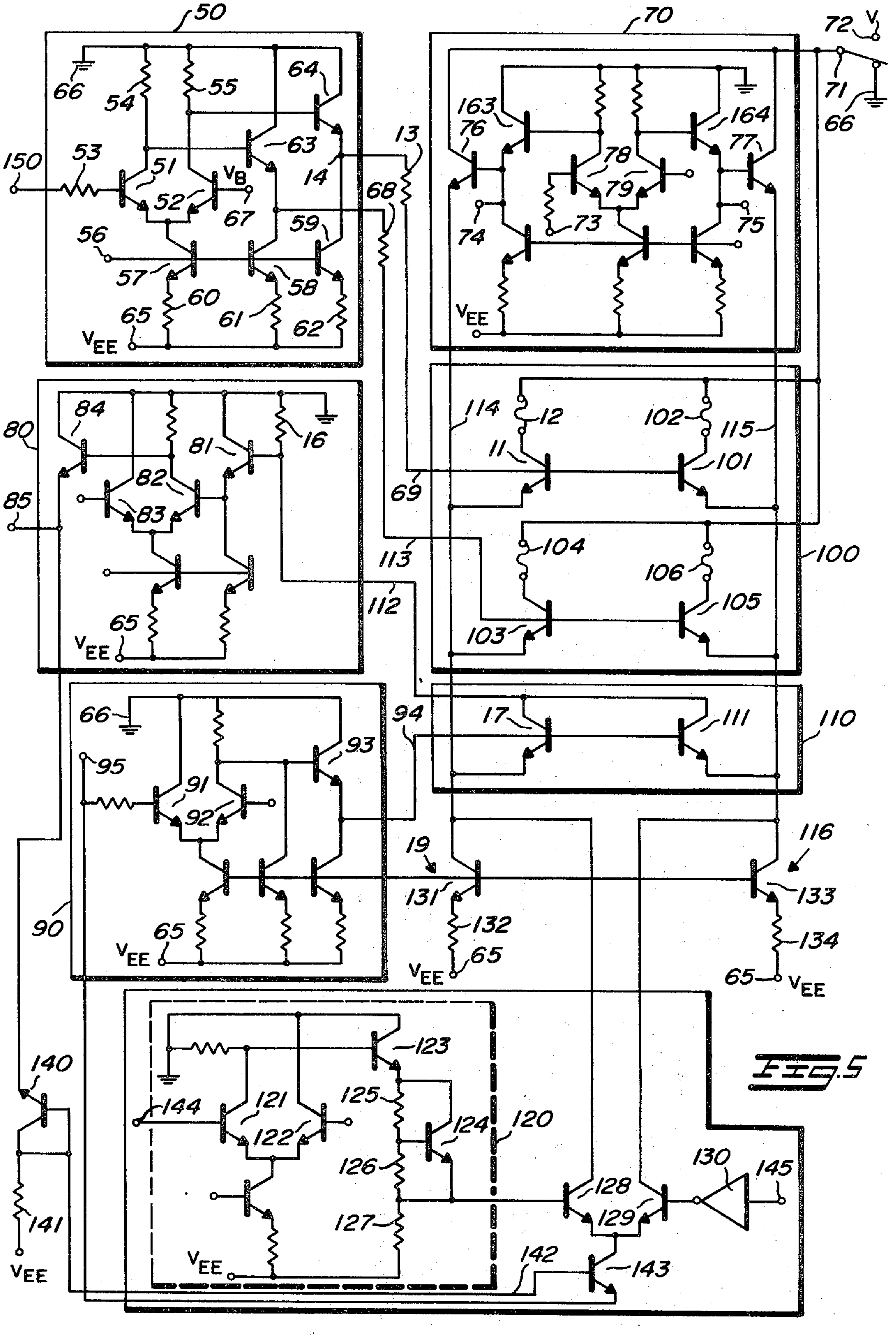
FIG. 5 is a partial schematic diagram of a four cell matrix.

FIG. 5 illustrates a four cell memory with the components being numbered the same as those of FIG. 1 wherever possible. A row selection circuit 50 has output terminal 14 connected to base resistor 13 which is in turn connected to the base of cell transistor 11. Row selection circuit 50 is a typical emitter coupled logic (ECL) circuit utilizing a differential pair of transistors 51 and 52 with transistor 52 having a fixed bias $V_B$ provided at terminal 67. Input terminal 150 is provided to receive an input signal to cause current to be conducted through resistor 54 and transistor 51. In ECL logic, a binary "1" may be represented by a −0.8 volts and binary "0" may be represented by −1.6 volts with the representation, of course, being completely arbitrary. When a "1" is presented at terminal 150, a "1" output appears at terminal 14, the emitter of transistor 64 and a "0" appears as an output at the emitter of transistor 63. The emitters of differential transistors 51 and 52 are connected together to the collector of transistor 57 whose emitter is connected, through resistor 60, to a source of negative voltage. The base of transistor 57 is connected to a bias source and transistor 57, together with resistor 60 serves a current source. The collector of transistor 51 is connected through resistor 54 to ground and also to the base of transistor 63. The collector of transistor 52 is connected through a resistor 55 to ground 66 and also to the base of transistor 64. The collector of transistor 63 is connected to ground and its emitter is connected to the collector of current source transistor 58 whose emitter is connected through resistor 61 to terminal 65, a negative voltage source. The emitter of transistor 63 is connected to resistor 68 which is in turn connected to conductor 113. The collector of transistor 64 is connected to ground and its emitter is connected to output terminal 14 and to the collector of transistor 59 whose emitter is connected through resistor 62 to terminal 65, a negative voltage source. The bases of transistors 58 and 59 are connected together and to the base of transistor 57.

Column selection circuit 70 is an ECL circuit, essentially identical to row selection circuit 50. Differential pair transistors 78 and 79 operate in identical fashion as the differential transistor pair 51 and 52 of row selection circuit 50. Outputs are provided at the emitters of output transistors 76 and 77. Output transistor 76 has its base connected to the emitter of transistor 163 which is equivalent to transistor 63 of row selection circuit 50. Transistor 77 has its base connected to the emitter of transistor 164 which is equivalent to transistor 64 of row selection circuit 50. The base to emitter voltage drop of each of transistors 76 and 77 provides negative voltages at the emitters of those two transistors of approximately −2.4 volts and approximately −1.6 volts, depending upon the input of the terminal 73. Outputs 74 and 75 of the emitters of transistors 163 and 164, respectively, are tied to inputs 144 and 145 of fusing circuits 120 and 130, respectively. The collectors of transistors 76 and 77 are connected to ground 66 or, for the fusing operation, to terminal 72 in which event a positive voltage is applied. The emitters of transistors 76 and 77 are connected, respectively, to column conductors 114 and 115. The bases of transistors 76 and 77 are conducted to the outputs of the column selection circuit 70.

Sense selection circuit 90 is essentially identical to the row and column selection circuits 50 and 70, having a differential pair of transistors 91 and 92 but with only one output available from the emitter of output transistor 93 on conductor 94. Transistor 93 corresponds to transistor 64 of row selection circuit 50. However, the output level available at the emitter of transistor 93 is shifted to provide a −1.2 volts with a "1" input at terminal 95 and a −2.0 volts with a "0" input provided.

Fusing circuit 120 differs from the aforementioned circuits to the extent that only one output is provided and furthermore, it is shifted through a voltage divider network of resistors 125, 126 and 127. The differential pair 121 and 122 serve to provide an output from the collector of transistor 121 to the base of transistor 123 whose collector is connected to ground and whose emitter is connected to the voltage divider, specifically connected to one end of resistor 125. Transistor 123 corresponds to transistor 63 of row selection circuit 50. The emitter is also connected to the collector of transistor 124 whose base is connected between resistors 125 and 126 and whose emitter is connected between resistors 126 and 127, the output of the fusing circuit. The input terminal 144 is connected to output terminal 74 of column selection circuit 70.

Memory cell section 100 is comprised of memory cell transistors 11 and 103 which are connected by their emitters, in the same column, to column conductor 114. Transistors 101 and 105 are connected together by their emitters to a column conductor 115. Transistors 11 and 101 are connected by their bases to row conductor 69 and transistors 103 and 105 are connected together by their bases to row conductor 113. The collector of transistor 11 is connected, through fusible link 12 to terminal 71, the collector of transistor 101 is connected through fusible link 102 to terminal 71, the collector of transistor 103 is connected, through fusible link 104 to terminal 71, and the collector of transistor 105 is connected, through fusible link 106, to terminal 71.

Transistor 17, whose emitter is connected to column conductor 114, serves as a sense transistor for both of cell transistors 11 and 103. Likewise, sense transistor 111, whose emitter is connected to column conductor 115, serves as a sense transistor for both of cell transistors 101 and 105. The bases of sense transistors 17 and 111 are connected together to conductor 94 and their collectors are connected together to conductor 112 which is, in turn, connected to output circuitry 80, specifically to one end of load resistor 16.

Current source 19 is comprised of transistor 131 and resistor 132 with the collector connected to column conductor 114 and with its emitter connected through resistor 132 to terminal 65, a negative voltage source. Current source 116 is comprised of resistor 134 and transistor 133, whose collector is connected to column conductor 115 and whose emitter is connected through resistor 134 to terminal 65, a negative voltage source. The collectors of transistors 131 and 133 are also tied, respectively, to the collectors of transistors 128 and 129 which are used in the fusing process for opening the fusible links. The bases of transistors 131 and 133 are tied together to a bias source. The emitters of transistors 128 and 129 are tied together to the collector of transistor 143 whose emitter is connected to terminal 95, the input terminal for sensing selection circuit 90. The base of transistor 143 is connected through conductor 142 to the base of transistor 140, the base of transistor 140 also being connected to the collector of 140 and through a resistor 141 to a terminal 65, a negative voltage reference. The emitter of transistor 140 is connected to output terminal 85. Fusing circuit 130, has an input 145 connected to output 75 from column selection circuit 70 and is identical in structure to fusing circuit 120, having an output connected to the base of transistor 129, whose collector is connected to the collector of transistor 133.

MODE OF OPERATION

First to be considered is the selection of a particular cell and the determination of the state of that cell. As an example, assume that the state of the cell containing cell transistor 11 is desired. Under those circumstances, the input at terminal 150 to row selection circuitry 50 is presented with a "1" which produces a "1" output from terminal 14, transmitted on row selection line 69 to the bases of transistors 11 and 101. Placing a "1" input on input terminal 73 of column selection circuit 70 provides a voltage on emitter of transistor 76 of approximately −2.4 volts which is transmitted to the emitters of transistors 11, 103 and 17. At the same time, a "0" at approximately −1.6 is present on the emitter of transistor 77 and is transmitted to transistors 101, 105 and 111. Also, a "0" is present at the emitter of transistor 63 of row selection circuit 50, which is conducted to the bases of transistors 103 and 105. If a "1" is placed at terminal 95 of the sense selection circuit, a voltage of approximately −1.2 is present at the emitter of transistor 93 and is conducted over the line 94 to the bases of sense transistors 17 and 111. When a "1" is not present at terminal 95, a voltage of approximately −2.0 is conducted over conductor 94 to the bases of transistors 17 and 111, keeping them cut off.

Transistor 103 has a voltage of approximately −1.6 on its base and a voltage of approximately −2.4 on its emitter, less than a forward biasing condition. Transistor 105 has a voltage of approximately −1.4 on its base and also on its emitter, keeping it from conducting. Transistor 101 has a voltage of approximately −0.8 on its base and −1.6 on its emitter, not enough for conduction. Selected transistor 11 has a −0.8 volts on its base and a −2.4 volts on its emitter, more than enough to forward bias transistor 11 and to cause its conduction.

Sense transistor 111 is held off by reason of having approximately −1.2 volts on its base and −1.6 on its emitter. Sense transistor 17 with −1.2 volts on its base and −2.4 volts on its emitter is in a forward biasing condition. However, the fusible link 12 is conductive and transistor 17 does not get turned on, but rather the 1 milliampere current $I_f$ supplied by current source 19 flows through fusible link 12 and cell transistor 11. On the other hand, if the fusible link 12 is open, then transistor 17 becomes conductive and approximately 85 percent of the 1 milliampere of current supplied by transistor 19 is conducted through transistor 17 indicating a "1" at terminal 85.

Next, the step of opening the fusible link must be considered. First, assume that transistor 11 has been selected to permanently store a "1" by having fusible link 12 opened.

To obtain the correct voltage and current, it is necessary to connect terminal 72 to terminal 71 thereby placing +5 volts at one end of each fusible link. The required current is provided by supplying a 30 milliampere current source at terminal 95. +1 volt is applied at terminal 85 which causes a −5 volts to be placed on the base of transistor 143 because of a zener action provided by transistor 140 which is connected as a diode and breaks down at approximately 6 volts. The emitter of 143 is biased through the 30 milliampere current source applied at terminal 95 to provide forward biasing of transistor 143 thus making it conductive. Fusing circuit 120 receives a "0" from output 74 of column selection circuit 70 providing a bias for transistor 128 to turn it on. Fusing circuit 130 is provided with a "1" and biases transistor 129 in the off state. A path for the 30 milliamperes of current is therefore provided from terminal 71 through fusible link 12, transistor 11, transistor 128, and transistor 143. The +5 volts present at fusible link 12 together with the 30 milliamperes of current opens fusible link 12. Any selected fusible link can be opened in this manner by going through the appropriate selection step and then applying the current and voltage as outlined above.

This particular fusing scheme lends itself ideally to ECL circuits. Those with ordinary skill in the art appreciate that the invention could also be used for other logic circuitry such as TTL and is not intended to be limited to ECL. Furthermore, the specific implementation is intended for example only and the invention is not limited by the specific parameters.

I claim:

1. An integrated circuit personalizable or programmable read only memory comprising:

a. a plurality of interconnected storage cells and means for accessing the plurality of storage cells;

b. the plurality of storage cells each including a first bipolar transistor having a fusible element connected to its collector terminal; and c. the accessing means connected to the plurality of cells being responsive for opening predetermined fusible elements.

2. An integrated circuit personalizable or programmable read only memory as in claim 1 wherein:

a. each of the plurality of cells comprises a differential common emitter pair of bipolar transistors wherein one of the transistors comprises said first transistor, said first transistor collector terminal being connected to the fusible element, the other transistor comprising a second sensing transistor, and a terminal connected to the common emitter connected pair of bipolar transistors for connecting to a current source for providing either a first or second level of current to one side of the cell in response to current flowing in a cell having an intact fusible element and a second level of current to said one side in response to the cell having an open fusible element.

3. An integrated circuit personalizable or programmable read only memory as in claim 1 further including:

a. a parasitic bipolar transistor means located at cells having an open fusible element for receiving a predetermined amount of current during accessing.

4. An integrated circuit personalizable or programmable read only memory as in claim 1 wherein:

a. each of said cells further includes a differential common emitter connected pair of bipolar transistors, one of said pair of transistors constituting said first transistor and having its collector terminal connected to the fusible element, and the other transistor constituting a second sensing transistor, and b. a current source connected to the common emitter connected pair of bipolar transistors for providing either a first or a second current level to the sensing transistor, the first level being generated in response to current flowing in a cell having an intact fusible element, and the second level being generated in a cell having an open fusible element.

5. An integrated circuit personalizable or programmable read only memory as in claim 4 further including:

a. an integrated circuit substrate for supporting said plurality of cells;

b. a parasitic bipolar transistor of opposite conductivity type to the said first transistor being located at each of the cells having an open fusible element and comprising a first region constituted by the base region of the said first transistor, a second region constituted by the collector region of the said first transistor, and a third region constituted by said substrate.

6. An integrated circuit personalizable or programmable read only memory as in claim 5 wherein:

a. said first region of the parasitic bipolar transistor comprises an emitter region, the second region comprises a base region, and the third region comprises a collector region; and b. said parasitic bipolar transistor being responsive to receive a predetermined amount of current from the current source when the fusible element in a predetermined cell is open.

* * * * *